United States Patent
Chen et al.

(10) Patent No.: US 12,499,860 B2
(45) Date of Patent: Dec. 16, 2025

(54) SOUND ABSORPTION APPARATUS, MANUFACTURING METHOD, AND ELECTRONIC DEVICE

(71) Applicant: Lenovo (Beijing) Limited, Beijing (CN)

(72) Inventors: Haiyan Chen, Beijing (CN); Jianxin Zhou, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 316 days.

(21) Appl. No.: 18/181,234

(22) Filed: Mar. 9, 2023

(65) Prior Publication Data

US 2023/0317045 A1    Oct. 5, 2023

(30) Foreign Application Priority Data

Mar. 31, 2022    (CN) .......................... 202210356684.3

(51) Int. Cl.
*G10K 11/162*    (2006.01)
*G06F 1/20*    (2006.01)

(52) U.S. Cl.
CPC .............. *G10K 11/162* (2013.01); *G06F 1/20* (2013.01)

(58) Field of Classification Search
CPC ................................ G10K 11/162; G06F 1/20
USPC .................................................. 181/224, 198
See application file for complete search history.

(56) References Cited

U.S. PATENT DOCUMENTS

| | | | | |
|---|---|---|---|---|
| 5,728,979 A | * | 3/1998 | Yazici | F24F 7/08 181/224 |
| 6,899,198 B2 | * | 5/2005 | Zindl | F04F 5/44 417/187 |
| 10,119,469 B2 | * | 11/2018 | Ponyavin | G10K 11/161 |
| 10,260,772 B2 | * | 4/2019 | Mouratidis | G10K 11/161 |
| 10,458,589 B2 | * | 10/2019 | Hill | F24F 13/24 |
| 11,604,007 B2 | * | 3/2023 | Mouratidis | G10K 11/161 |
| 11,885,264 B2 | * | 1/2024 | Lin | B33Y 10/00 |
| 12,125,464 B2 | * | 10/2024 | Gerdes | G10K 11/168 |
| 2006/0144638 A1 | * | 7/2006 | Radatus | F24F 13/02 181/224 |

* cited by examiner

Primary Examiner — Forrest M Phillips
(74) Attorney, Agent, or Firm — ANOVA LAW GROUP, PLLC

(57) ABSTRACT

A sound absorption apparatus includes a sound absorption unit. The sound absorption unit includes: a connection member including a first connection surface and a second connection surface arranged opposite to the first connection surface, the first connection surface and the second connection surface being parallel to a flow direction of a cooling air flow, and the cooling air flow being an air flow flowing through the sound absorption unit; and a plurality of sound absorption members each being permeable and including: a third connection surface configured to connect to one of the first connection surface and the second connection surface; and a sound absorption surface surrounding the one of the first connection surface and the second connection surface.

15 Claims, 9 Drawing Sheets

SOUND ABSORPTION APPARATUS, MANUFACTURING METHOD, AND ELECTRONIC DEVICE

CROSS-REFERENCE TO RELATED APPLICATION

This application claims priority to Chinese Patent Application No. 202210356684.3, filed on Mar. 31, 2022, the entire content of which is incorporated herein by reference.

TECHNICAL FIELD

The present disclosure relates to the technical field of noise reduction and sound absorption and, more particularly, to a sound absorption apparatus, a manufacturing method, and an electronic device.

BACKGROUND

Electronic devices such as computers, servers, storage devices generate heat when they are in operation. Fans are needed to cool down the electronic devices to ensure their normal operation. However, when a fan is running, the fan makes noise. The fan noise includes irregular combination of many sounds at different frequencies, different intensities, and different phases, and affects the performance of the electronic devices.

To reduce the fan noise, engineers often add sound absorption materials to the bottom and top of the fan where the fan contacts the chassis or the back of the hard disk backplane to achieve the objective of noise reduction. Due to the space limitation of the electronic devices, the contact surface between the sound absorption material and the air is also limited, which affects the sound absorption effect of the sound absorption material.

SUMMARY

One aspect of the present disclosure provides a sound absorption apparatus. The sound absorption apparatus includes a sound absorption unit. The sound absorption unit includes: a connection member including a first connection surface and a second connection surface arranged opposite to the first connection surface, the first connection surface and the second connection surface being parallel to a flow direction of a cooling air flow, and the cooling air flow being an air flow flowing through the sound absorption unit; and a plurality of sound absorption members. Each of the plurality of sound absorption members is permeable and includes: a third connection surface configured to connect to one of the first connection surface and the second connection surface; and a sound absorption surface surrounding the one of the first connection surface and the second connection surface.

Another aspect of the present disclosure provides a method of manufacturing a sound absorption unit. The method includes: obtaining a sound absorption material with a constant cross-sectional area; determining a cutting line according to the sound absorption material with the constant cross-sectional area, and cutting the sound absorption material according to the cutting line to obtain a first sound absorption member and a second sound absorption member, a surface of each of the first sound absorption member and the second sound absorption member being a cutting surface; obtaining a connection member including a first connection surface and a second connection surface arranged opposite to the first connection surface; for each of the first sound absorption member and the second sound absorption member, selecting a surface facing away from the cutting surface as a third connection surface; and connecting the third connection surface of the first sound absorption member to one of the first connection surface and the second connection surface of the connection member, and connecting the third surface of the second sound absorption member to another one of the first connection surface and the second connection surface of the connection member.

Another aspect of the present disclosure provides an electronic device. The electronic device includes: a cooling device; a working device; and a sound absorption apparatus disposed between the cooling device and the working device and including a sound absorption unit. The sound absorption unit includes: a connection member including a first connection surface and a second connection surface arranged opposite to the first connection surface, the first connection surface and the second connection surface being parallel to a flow direction of a cooling air flow, and the cooling air flow being an air flow flowing through the sound absorption unit; and a plurality of sound absorption members. Each of the plurality of sound absorption members is permeable and includes: a third connection surface configured to connect to one of the first connection surface and the second connection surface; and a sound absorption surface surrounding the one of the first connection surface and the second connection surface.

BRIEF DESCRIPTION OF THE DRAWINGS

To more clearly illustrate the technical solution of the present disclosure, the accompanying drawings used in the description of the disclosed embodiments are briefly described below. The drawings described below are merely some embodiments of the present disclosure. Other drawings may be derived from such drawings by a person with ordinary skill in the art without creative efforts and may be encompassed in the present disclosure.

In the drawings, identical or corresponding labels represent identical or corresponding parts.

Figure 1:
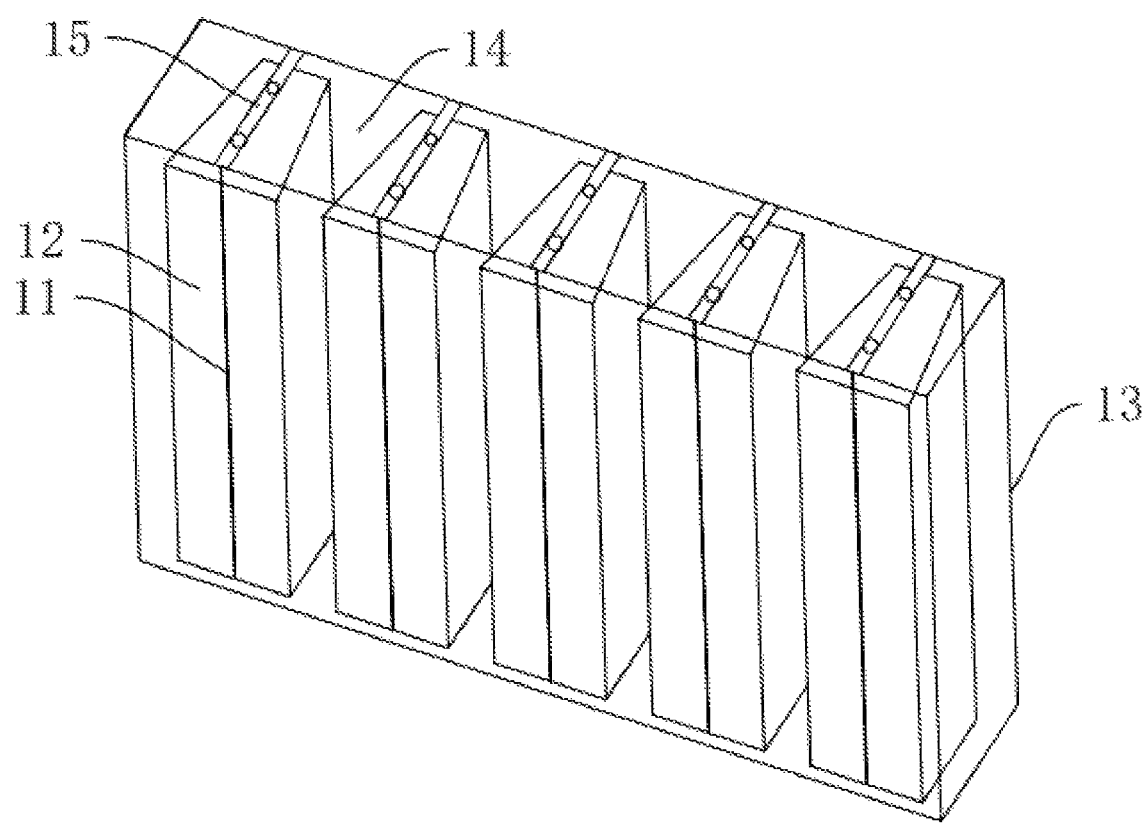
FIG. 1 is a schematic perspective view of an exemplary sound absorption apparatus according to some embodiments of the present disclosure.

The reference labels in the drawings include:

1 sound absorption unit,
11 connection member,
111 first connection surface,
112 second connection surface
12 sound absorption member,
121 third connection surface,
122 sound absorption surface,
13 enclosure,
14 cooling passage,
15 fixation member,
16 sound absorption block
2 working device,
3 cooling device,
31 working unit,
4 chassis, and
5 sound absorption material.

DETAILED DESCRIPTION OF THE EMBODIMENTS

In order to make the objectives, technical solutions, and advantages of the present disclosure clearer, the present disclosure will be further described in detail below with reference to the accompanying drawings. Obviously, the described embodiments are only some of the embodiments of the present disclosure, not all of the embodiments. Based on the embodiments of the present disclosure, all other embodiments obtained by those of ordinary skill in the art without creative efforts shall fall within the scope of the present disclosure.

Figure 2:
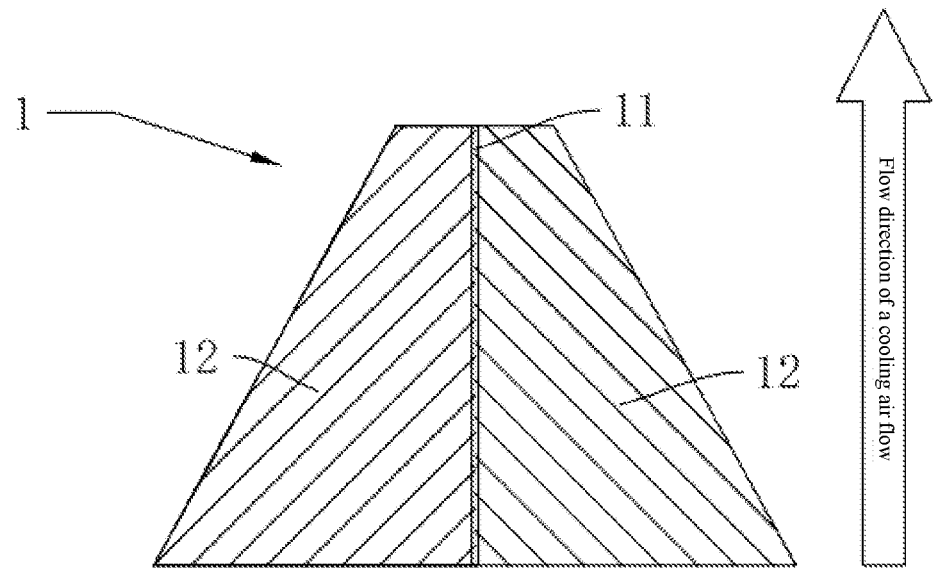
FIG. 2 is a schematic cross-sectional view of a sound absorption unit in an exemplary sound absorption apparatus according to some embodiments of the present disclosure.
Figure 3:
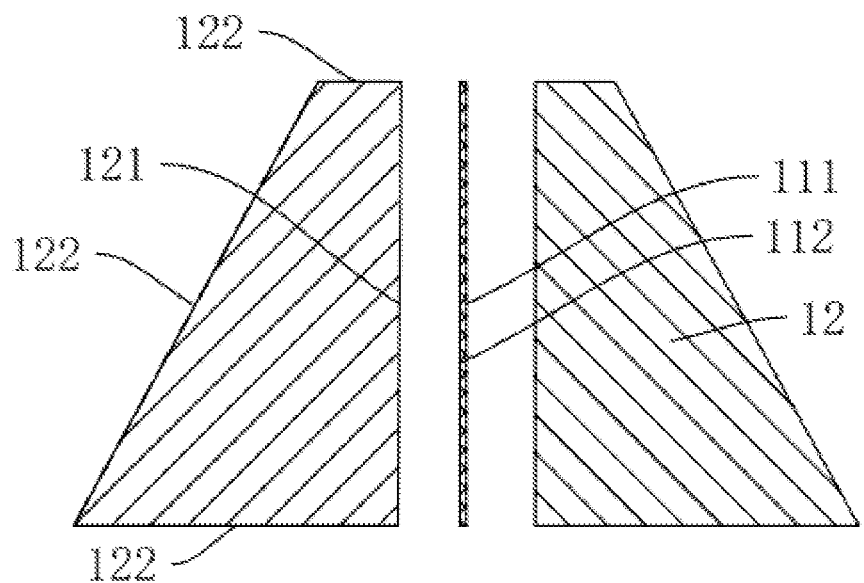
FIG. 3 is a schematic cross-sectional exploded view of a sound absorption unit in an exemplary sound absorption apparatus according to some embodiments of the present disclosure.

FIG. 1 is a schematic perspective view of an exemplary sound absorption apparatus according to some embodiments of the present disclosure. FIG. 2 is a schematic cross-sectional view of a sound absorption unit in an exemplary sound absorption apparatus according to some embodiments of the present disclosure. FIG. 3 is a schematic cross-sectional exploded view of a sound absorption unit in an exemplary sound absorption apparatus according to some embodiments of the present disclosure.

The present disclosure provides a sound absorption apparatus. As shown in FIG. 1, FIG. 2, and FIG. 3, the sound absorption apparatus includes at least one sound absorption unit 1. The sound absorption unit 1 includes a connection member 11 and sound absorption members 12. The connection member 11 includes a first connection surface 111 and a second connection surface 112 arranged opposite to the first connection surface 111. The first connection surface 111 and the second connection surface 112 are parallel to a flow direction of a cooling air flow. At least one sound absorption member 12 is connected to each of the first connection surface 111 and the second connection surface 112. The sound absorption member 12 includes a third connection surface 121 and a sound absorption surface 122 surrounding the first connection surface 111 or the second connection surface 112. The third connection surface 121 is configured to connect to the first connection surface 111 or the second connection surface 112. The sound absorption member 12 is permeable (i.e., air breathable). The cooling air flow is an air flow flowing through the sound absorption unit 1.

In some embodiments, the sound absorption unit 1 includes the connection member 11 that is arranged in parallel to the flow direction of the cooling air flow, and the sound absorption members 12 respectively connected to the first connection surface 111 and the second connection surface 112 of the connection member 11. The connection member 11 and the sound absorption members 12 together form the sound absorption unit 1. During the operation of the sound absorption unit 1, the sound absorption surfaces 122 of the sound absorption unit 1 are placed in the flowing air, such that the noise passes along with the cooling air flow through the sound absorption surfaces 122 to the maximum extent for noise reduction treatment, and the sound absorption effect of the sound absorption unit 1 is improved.

Specifically, the connection member 11 is used for connecting the sound absorption members 12. The connection member 11 may be a plate. The thinner the plate, the smaller the influence of the plate on the sound absorption effect. The connection member 11 may be any plate that provides a support function. For example, the connection member 11 may be a metal plate or a plastic plate that is not easily deformed. In some embodiments, air vents may be provided on the plate, such that the cooling air flow and the noise flow and propagate through the air vents on the plate between the sound absorption members 12 on both sides of the connection member 11, and the sound absorption effect is further improved. The connection member 11 is also used for connecting the sound absorption unit 1 to an enclosure 13 of the sound absorption apparatus. Thus, the objective of placing the sound absorption surfaces 122 of the sound absorption unit 1 in the flowing air is achieved, and the noise enters inside the sound absorption member 12 through the sound absorption surfaces 122 for the noise reduction.

Figure 4:
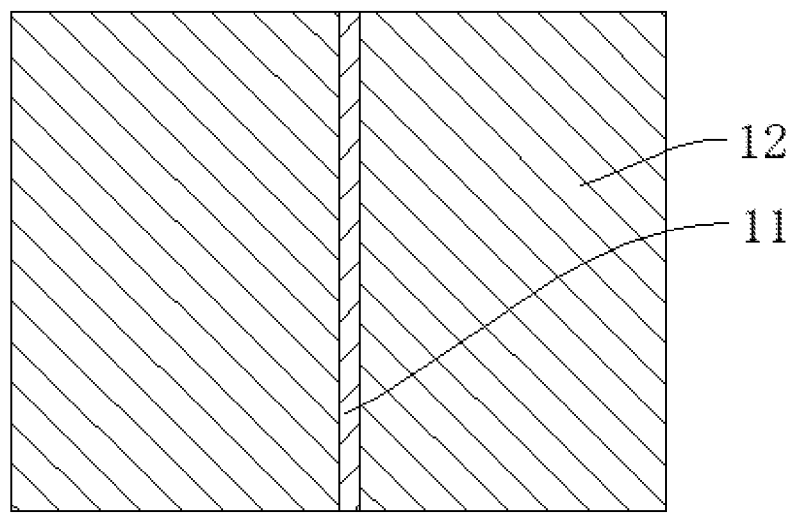
FIG. 4 is a schematic cross-sectional view of a sound absorption unit in another exemplary sound absorption apparatus according to some embodiments of the present disclosure.

FIG. 4 is a schematic cross-sectional view of a sound absorption unit in another exemplary sound absorption apparatus according to some embodiments of the present disclosure.

As shown in FIG. 3 and FIG. 4, the material of the sound absorption members 12 may be an air permeable material with a large number of microporous structures on the surface and inside. For example, the material of the sound absorption members 12 may be asbestos, glass wool felt, and polyester fiber sound absorption cotton. In some embodiments, the sound absorption members 12 may be fixed to the first connection surface 111 or the second connection surface 112 by glue bonding. According to actual needs, the sound absorption members 12 may have a constant cross-section or a variable cross-section. The constant cross-section sound absorption members 12 may have a constant cross-section area in a direction perpendicular to or parallel to the connection member 11, for example, a rectangular parallelepiped shape or a cylindrical shape. The variable cross-section sound absorption members 12 may have an inconsistent cross-section area in the direction perpendicular to or parallel to the connection member 11, for example, a cone shape or a trapezoidal shape. Further, because the sound absorption unit 1 is formed by at least two sound absorption members 12 and the connection member 11, the sound absorption unit 1 may be a variable cross-section sound absorption unit 1 or a constant cross-section sound absorption unit 1, depending on formation methods of the sound absorption members 12.

When the sound absorption apparatus is applied to an electronic device, the sound absorption apparatus may be disposed inside or outside of the electronic device to perform the noise reduction treatment on the noise generated from the electronic device, or parts or components of the electronic device, thereby reducing the noise. In some embodiments, the sound absorption apparatus may be disposed between a noise zone and soundproof zone. The noise zone may include a cooling device 3 such as a fan for forming a cooling air flow. The soundproof zone may include noise sensitive electronic components, such as a mechanical hard drive. When the cooling air flow flows from the soundproof zone to the noise zone, the noise generated from the noise zone enters inside the sound absorption members 12 through the sound absorption surfaces 122 for sound absorption. The sound absorption members 12 absorb the noise, thereby reducing the impact of the noise zone on the soundproof zone.

In some embodiments, the sound absorption member 12 is the variable cross-section sound absorption member 12. The sound absorption surface 122 of the sound absorption member 12 facing away from the third connection surface 121 has a cross-sectional area gradually change in a direction along the third connection surface 121. A width ratio of the sound absorption surface 122 facing toward the cooling air flow over the sound absorption surface 122 facing away from the cooling air flow is approximately 2~3:0~1.

When the sound absorption member 12 is the variable cross-section sound absorption member 12, it facilitates absorbing the noise formed by random combination of sounds with different frequencies, intensities, and phases, thereby improving sound absorption effectiveness. In addition, because the variable cross-section sound absorption members 12 are assembled into the variable cross-section sound absorption unit 1, the variable cross-section sound absorption unit 1 is also able to absorb the noise formed by random combination of sounds with different frequencies, intensities, and phases.

To further improve the sound absorption effectiveness, the variable cross-section sound absorption member 12 has the cross-sectional area gradually change in the direction along the third connection surface 121. As such, the noise passing through the sound absorption member 12 may be absorbed by the sound absorption material with different thicknesses respectively. The sound absorption material with different thicknesses absorbs the noise with different frequencies. The thinner sound absorption material absorbs more high frequency noise while the thicker sound absorption material absorbs more low frequency noise. As such, the variable cross-section sound absorption unit 1 provided by the present disclosure absorbs the noise in a wider frequency range, thereby ensuring the sound absorption effectiveness. The width ratio of the sound absorption surface 122 facing toward the cooling air flow over the sound absorption surface 122 facing away from the cooling air flow is approximately 2~3:0~1. Thus, the arrangement covers as many frequencies of the noise as possible, gradually increases a circulation area of the cooling air flow, slows down the air flow velocity, reduces turbulent fluidity, and helps to ensuring cooling effectiveness.

When the sound absorption member 12 is the variable cross-section sound absorption member 12, the sound absorption member 12 may be any one of a right-angled polygonal pyramid, a right-angled polygonal prism, a semi-cone, or a semi-circular prism. The right-angled surface of the sound absorption member 12 is the third connection surface 121. In some embodiments, according to actual needs, the constant cross-section sound absorption member 12 and the variable cross-section sound absorption member 12 may be assembled together to form the variable cross-section sound absorption unit 1, the variable cross-section sound absorption members 12 may be assembled together to form the variable cross-section sound absorption unit 1, and the constant cross-section sound absorption members 12 may be assembled together to form the constant cross-section sound absorption unit 1. Thus, the assembled sound absorption unit 1 may be in any one of a semi-conical shape, a polygonal prism shape, a polygonal pyramid shape, a conical shape, or an irregular shape.

In some embodiments, the sound absorption apparatus further includes the enclosure 13. A plurality of sound absorption units 1 are disposed inside the enclosure 13. A cooling passage 14 is formed between adjacent sound absorption units 1 for supplying the cooling air flow. A cross-sectional area of the cooling passage 14 gradually increases in the flow direction of the cooling air flow while a cross-sectional area of the sound absorption unit 1 gradually decreases in the flow direction of the cooling air flow.

Figure 5:
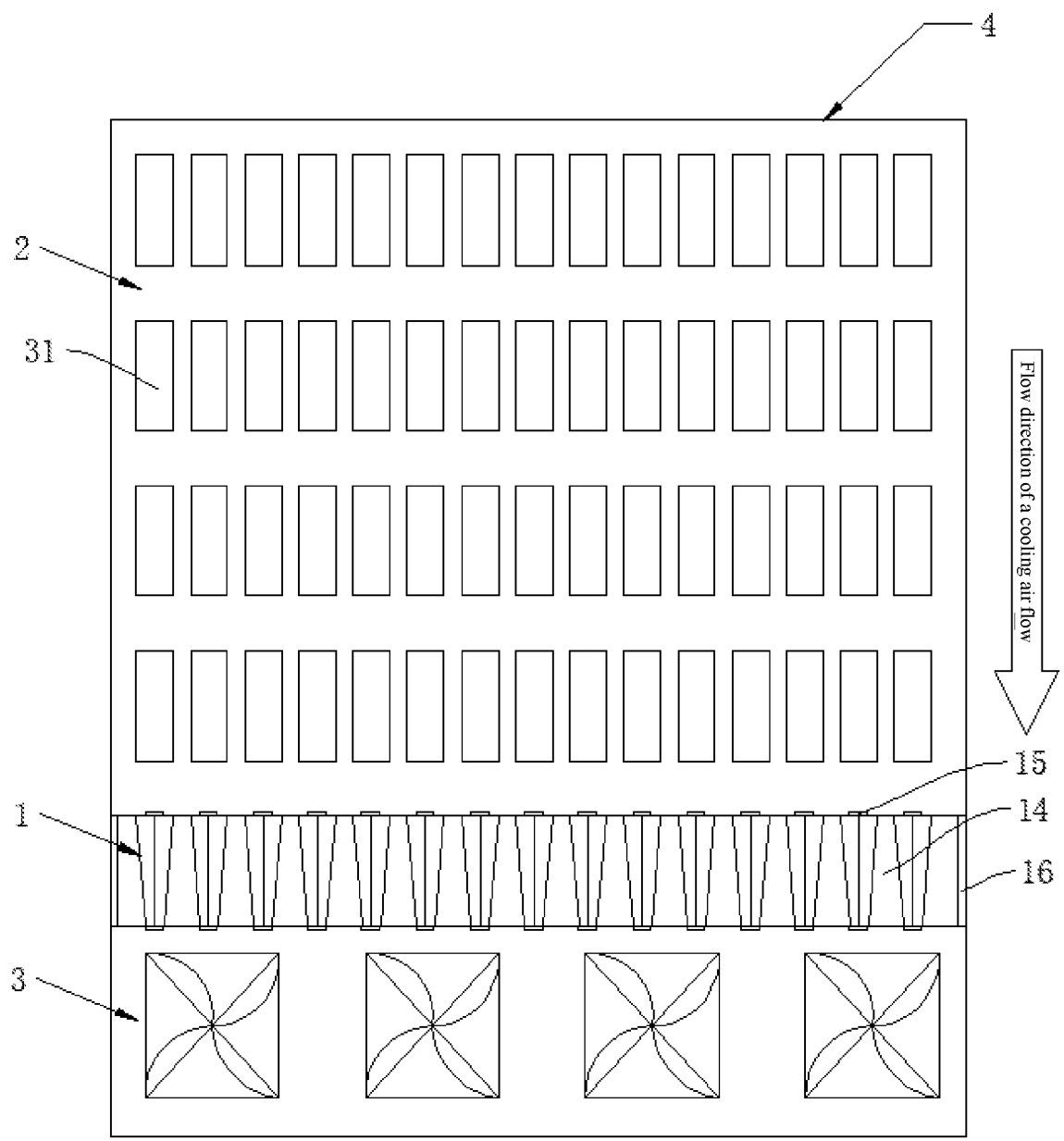
FIG. 5 is a schematic diagram of an overall structure of an exemplary electronic device according to some embodiments of the present disclosure.

FIG. 5 is a schematic diagram of an overall structure of an exemplary electronic device according to some embodiments of the present disclosure.

In some embodiments, as shown in FIG. 5, the sound absorption units 1 provided by the present disclosure are arranged equidistantly or in variable distance inside the enclosure 13, such that the cooling passage 14 for the cooling air flow is formed between two adjacent sound absorption units 1. When the sound absorption unit 1 is the variable cross-section sound absorption unit 1, the cross-sectional area of the cooling passage 14 may also vary. In this way, the flow rate of the cooling air flow can be adjusted by adjusting the cross-sectional area of the cooling passage 14. In some embodiments, the cross-sectional area of the cooling passage 14 gradually increases in the flow direction of the cooling air flow. The arrangement slows down the air velocity of the cooling air flow and reduces a degree of turbulence, thereby improving the sound absorption effectiveness and the cooling effectiveness. Correspondingly, the cross-sectional area of the sound absorption unit 1 decreases gradually in the flow direction of the cooling air flow, such that the sound absorption unit 1 absorbs as much noise with different frequencies as possible from a cooling device 3. The cooling passage 14 is oriented toward a same direction as the flow direction of the cooling air flow.

In some embodiments, the sound absorption apparatus further includes a fixation member 15. The connection member 11 is connected to the enclosure 13 through the fixation member 15. The fixation member 15 is disposed between the first connection surface 111 and the second connection surface 112. The fixation member 15 is used to fix the connection member 11 inside a sound absorption space, such that the entire sound absorption surface 122 is disposed inside the sound absorption space. The connection member 11 is connected to the enclosure 13 through the fixation member 15. Thus, the connection between the sound absorption unit 1 and the enclosure 13 does not block the sound absorption surface 122, the sound absorption surface 122 is ensured to fully contact the noise, and the sound absorption effectiveness is ensured.

In some embodiments, a sound absorption block 16 is configured on a side of the enclosure 13 facing toward the sound absorption unit 1. In practical applications, the enclosure 13 is often made of a metal. When the noise directly contacts the enclosure 13, the noise accelerates its propagation, resulting in louder noise near two sides of the enclosure 13. As such, the sound absorption block 16 is configured on each side of the enclosure 13 facing toward the sound absorption unit 1 to absorb the noise close to the enclosure 13 and protect the components located in the soundproof zone in all directions.

As shown in FIG. 5, the electronic device includes the cooling device 3, a working device 2, and any of the above-described sound absorption apparatus. The sound absorption apparatus is disposed between the cooling device 3 and the working device 2.

In some embodiments, the sound absorption solution is applied to a chassis 4. The cooling device 3 and the working device 2 are disposed inside the chassis 4. The cooling device 3 is used to cool the working device 2 disposed inside the chassis 4. For example, the cooling device 3 includes a plurality of fans. When in operation, the cooling device 3 generates the noise with different frequencies. The working device 2 includes noise sensitive components such as mechanical hard drives. For example, the working device 2 may be a storage device having a JBOD ("just a bunch of disks" or "just a bunch of drives") configuration. The plurality of fans drive the cooling air flow to flow from the working device 2 to the cooling device 3. The noise generated by the plurality of fans is reduced when passing through the sound absorption apparatus.

In some embodiments, the working device 2 includes a plurality of working units 31. The sound absorption unit 1 is located right in between the working units 31 and the cooling device 3, and a thickness of one sound absorption unit 1 is no smaller than a thickness of one working unit 31. Thus, the plurality of working units 31 are prevented from being directly exposed to the cooling device 3, and are hence protected.

In some embodiments, the working device 2 includes the plurality of working units 31. For example, the working device 2 includes a plurality of mechanical hard drives. The sound absorption apparatus is disposed between the plurality of working units 31 and the cooling deice 3. Each sound absorption unit 1 in the sound absorption apparatus is disposed directly in the direction from an individual working unit 31 to the cooling device 3. The arrangement prevents the fan air from blowing directly onto the individual working unit 31. The noise generated from the plurality of fans may only reach the individual working unit 31 after passing through the corresponding sound absorption unit 1, thereby improving protection effectiveness on the individual working unit 31. In one application scenario, a width of the individual mechanical hard drive is about 26 mm. A width of the sound absorption surface of the corresponding sound absorption unit facing toward the individual mechanical hard drive is greater than or equal to about 26 mm. For example, a distance between adjacent individual mechanical hard drives is about 6 mm, and a distance between the sound absorption surfaces of the corresponding sound absorption units facing toward adjacent individual mechanical hard drives is also about 6 mm. The width of the sound absorption surface of the sound absorption unit facing away from the individual mechanical hard drive is about 12 mm~18 mm. Further, the width of the sound absorption surface is preferably 16 mm. In this case, the noise reduction is optimal.

Figure 6:
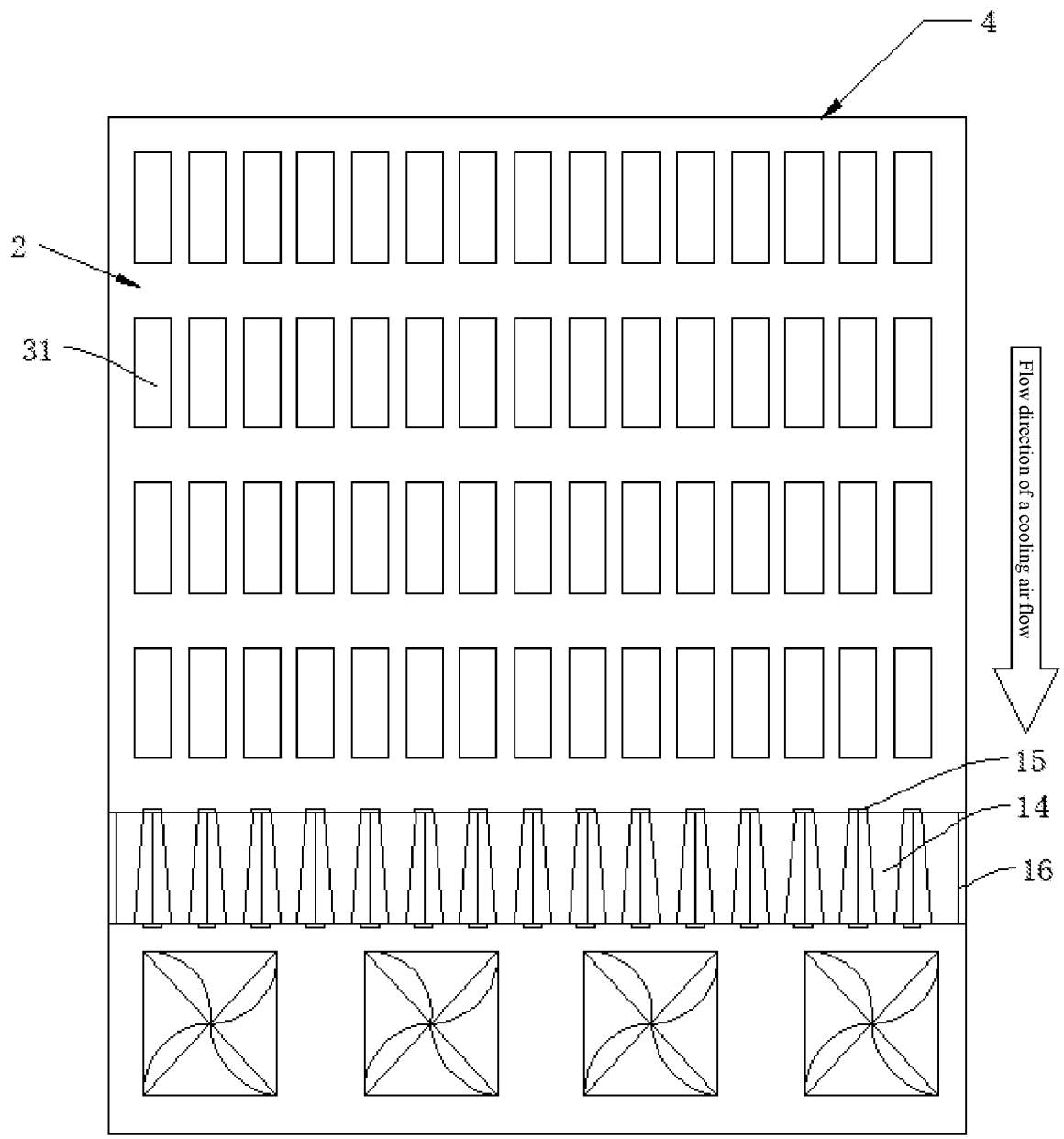
FIG. 6 is a schematic diagram of an overall structure of another exemplary electronic device according to some embodiments of the present disclosure.

FIG. 6 is a schematic diagram of an overall structure of another exemplary electronic device according to some embodiments of the present disclosure.

As shown in FIG. 6, the sound absorption apparatus in this application scenario is different from the above-described embodiments. In this application scenario, the cross-sectional area of the cooling passage 14 between two adjacent sound absorption units 1 gradually decreases in the flow direction of the cooling air flow while the cross-sectional area of the sound absorption unit 1 gradually increases in the flow direction of the cooling air flow.

Figure 7:
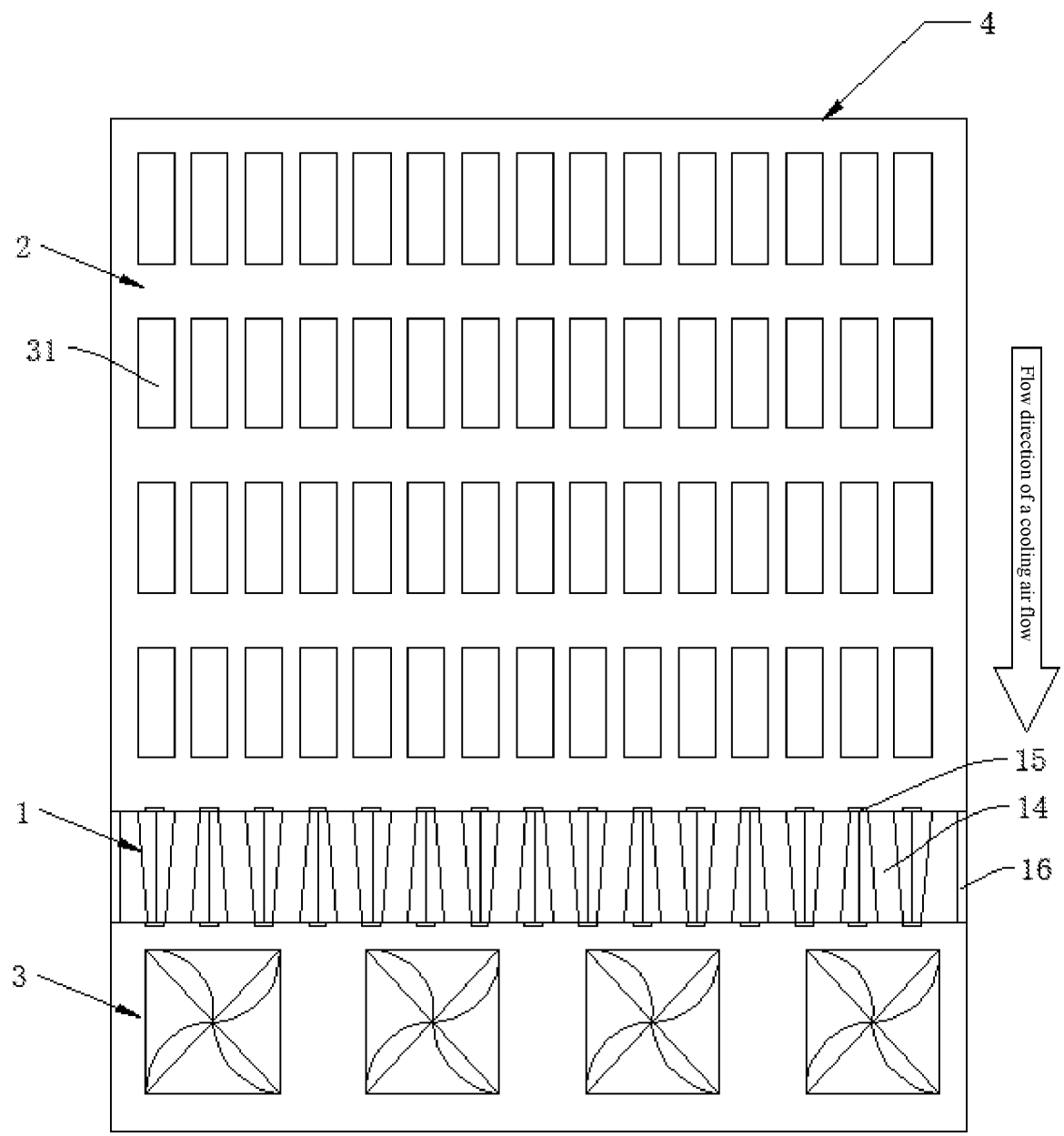
FIG. 7 is a schematic diagram of an overall structure of another exemplary electronic device according to some embodiments of the present disclosure.

FIG. 7 is a schematic diagram of an overall structure of another exemplary electronic device according to some embodiments of the present disclosure.

As shown in FIG. 7, the sound absorption apparatus in this application scenario is different from the above-described embodiments. In this application scenario, the cross-sectional area of the cooling passage 14 between two adjacent sound absorption units 1 remains unchanged in the flow direction of the cooling air flow. The cooling passage 14 faces toward a direction that is different from the flow direction of the cooling air flow. Adjacent cooling passages 14 face toward different directions. The sound absorption unit 1 may be a first sound absorption unit whose cross-sectional area gradually increases along the flow direction of the cooling air flow or a second sound absorption unit whose cross-sectional area gradually decreases along the flow direction of the cooling air flow. The first sound absorption unit and the second sound absorption unit are alternately arranged.

Figure 8:
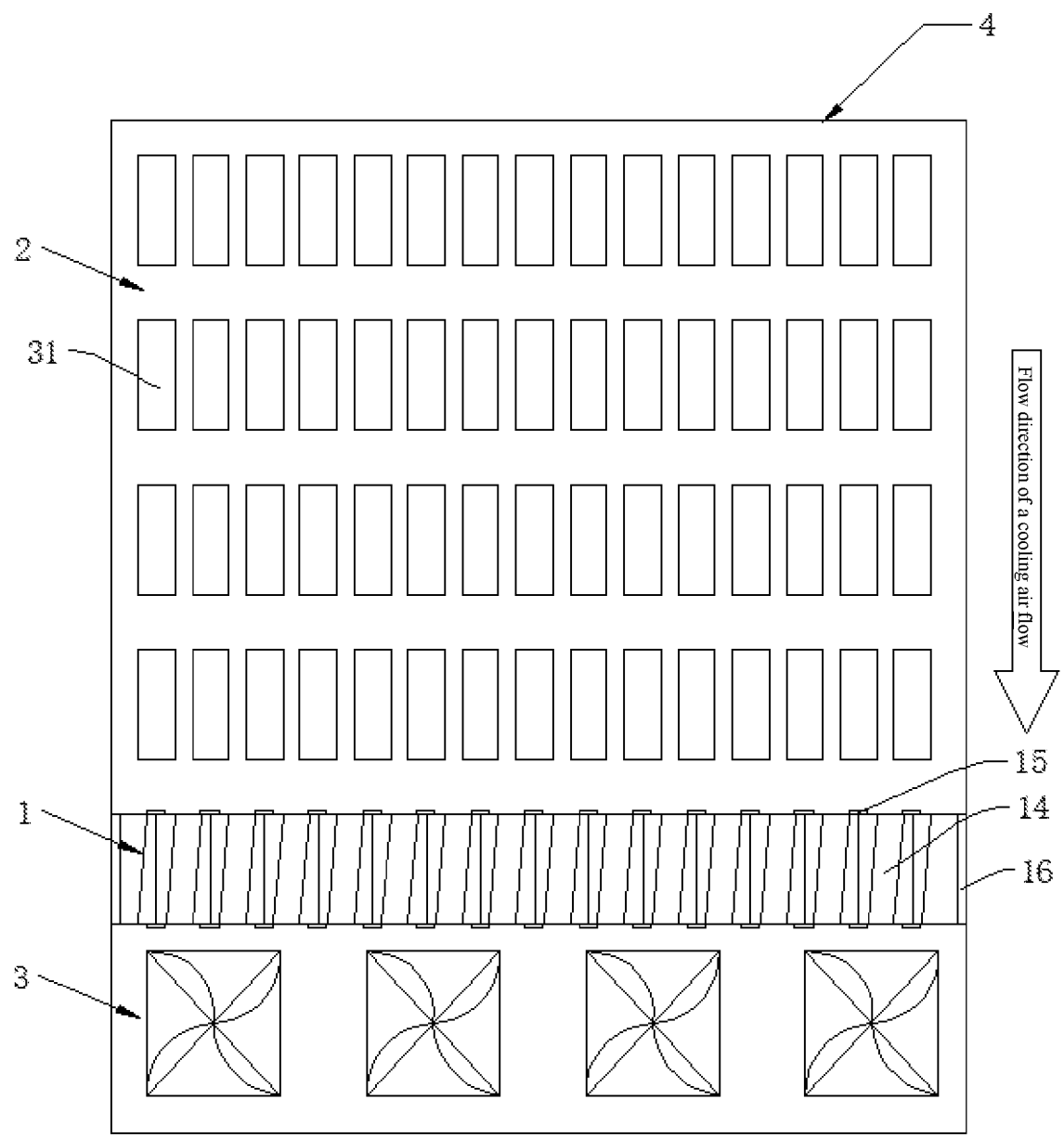
FIG. 8 is a schematic diagram of an overall structure of another exemplary electronic device according to some embodiments of the present disclosure.

FIG. 8 is a schematic diagram of an overall structure of another exemplary electronic device according to some embodiments of the present disclosure.

As shown in FIG. 8, the sound absorption apparatus in this application scenario is different from the above-described embodiments. In this application scenario, the cross-sectional area of the cooling passage 14 between two adjacent sound absorption units 1 remains unchanged in the flow direction of the cooling air flow. The cooling passage 14 faces toward a direction that is different from the flow direction of the cooling air flow. The cross-sectional area of the sound absorption unit 1 remains unchanged in the flow direction of the cooling air flow.

Figure 9:
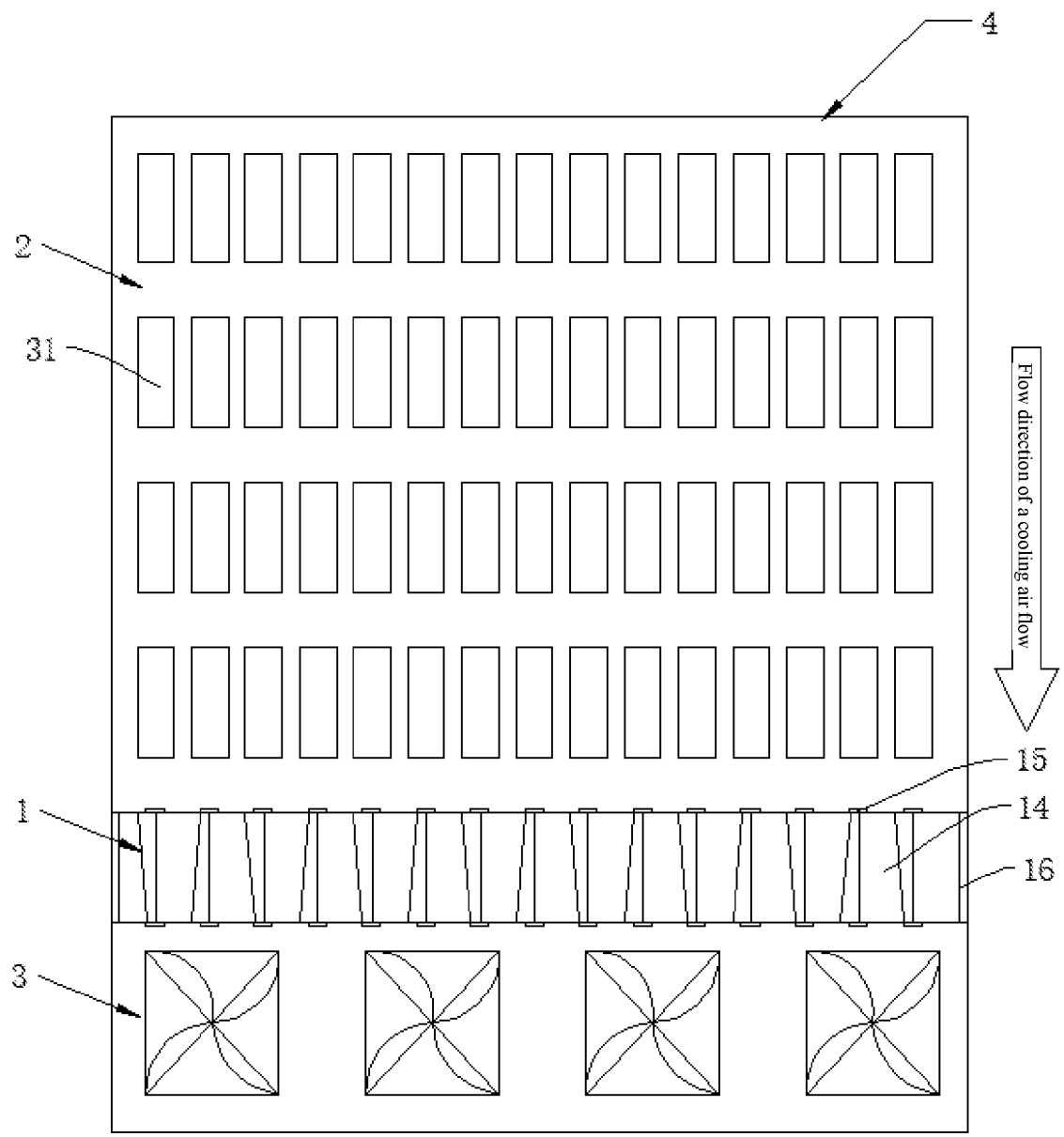
FIG. 9 is a schematic diagram of an overall structure of another exemplary electronic device according to some embodiments of the present disclosure.

FIG. 9 is a schematic diagram of an overall structure of another exemplary electronic device according to some embodiments of the present disclosure.

As shown in FIG. 9, the sound absorption apparatus in this application scenario is different from the above-described embodiments. In this application scenario, the cooling passage 14 includes a first cooling passage whose cross-sectional area gradually increases in the flow direction of the cooling air flow and a second cooling passage whose cross-sectional area gradually decreases in the flow direction of the cooling air flow. The cooling passage 14 faces toward a direction that is the same as the flow direction of the cooling air flow. The sound absorption unit 1 includes a third sound absorption unit whose cross-sectional area gradually increases in the flow direction of the cooling air flow and a fourth sound absorption unit whose cross-sectional area gradually decreases in the flow direction of the cooling air flow. The third sound absorption unit and the fourth sound absorption unit are alternately arranged.

Figure 10:
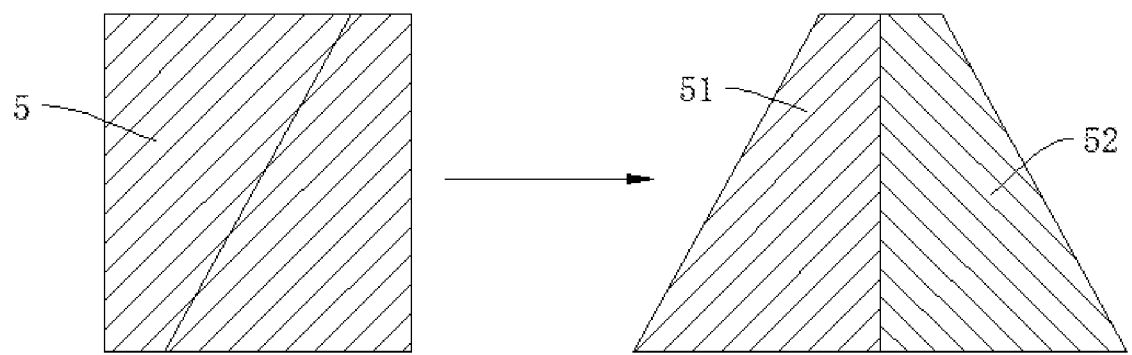
FIG. 10 schematically shows an exemplary method of manufacturing a sound absorption apparatus according to some embodiments of the present disclosure.

The present disclosure also provides a method of manufacturing a sound absorption apparatus. FIG. 10 schematically shows an exemplary method of manufacturing a sound absorption apparatus according to some embodiments of the present disclosure.

As shown in FIG. 10, the method includes: obtaining a sound absorption material 5 with a constant cross-sectional area for the sound absorption member; determining a cutting line according to the sound absorption material with the constant cross-sectional area, and cutting the sound absorption material according to the cutting line to obtain a first sound absorption member 51 and a second sound absorption member 52; selecting a surface of the first sound absorption member 51 or the second sound absorption member 52 that is facing away from a cutting surface as the third connection surface; and connecting the third connection surface of the first sound absorption member 51 to one of the first connection surface and the second connection surface of the connection member and connecting the third surface of the second sound absorption member 52 to another one of the first connection surface and the second connection surface of the connection member, such that at least one sound absorption member is connected to each of the first connection surface and the second connection surface.

The processing method provided by the present disclosure is used to process the variable cross-section sound absorption unit. Through cutting the sound absorption material with equal cross-sections, no sound absorption material is wasted. In addition, the process is simple to perform with only one cut. As a result, the processing cost and the material cost are reduced. In some embodiments, the sound absorption material is a sound absorption cotton cuboid. The sound absorption cotton cuboid is cut according to the required size to obtain the first sound absorption member 51 and the second sound absorption member 52. The surface facing away from the cutting surface is determined as the third connection surface. The third connection surface is bonded to either the first connection surface or the second connection surface of the connection member to obtain the sound absorption unit. The sound absorption units are then assembled into the sound absorption apparatus.

In some embodiments, determining the cutting line according to the sound absorption material with the constant cross-section area includes: determining a tilted cutting line according to the sound absorption material with the constant cross-section area, where a length of the tilted cutting line is greater than an edge of the sound absorption material with the constant cross-section area. For example, according to actual requirements for the sound absorption unit, this approach may use any side of the sound absorption cotton cuboid as a reference when cutting, and may cut obliquely or vertically to obtain the first sound absorption member and the second sound absorption member of a constant or variable cross-sectional area. The approach adopts a chamfering method to obtain the first sound absorption member and the second sound absorption member with chamfered surfaces.

Processes may be re-ordered, added, or deleted using various forms of flow shown above. For example, the processes described in the present disclosure may be executed in parallel, sequentially, or in a different order, as long as the desired result of the technical solution disclosed in the present disclosure can be achieved. No limitation is imposed herein.

In the following description, references to "some embodiments" describe a subset of all possible embodiments, but it is understood that "some embodiments" may be the same subset or a different subset of all possible embodiments, and may be combined with each other under the circumstances of no conflict.

Terms such as "first\second\third" in the embodiments of the present disclosure are merely used to distinguish similar objects, and do not represent a specific ordering of objects. Understandably, whenever permitted, specific orders or sequences of "first\second\third" objects/events may be interchanged such that the embodiments of the present disclosure described herein can be practiced in sequences other than those illustrated or described herein.

The above description of the disclosed embodiments enables those skilled in the art to implement or use the present disclosure. Various modifications to the embodiments will be obvious to those skilled in the art, and the general principles defined herein can be implemented in other embodiments without departing from the spirit or scope of the present disclosure. Therefore, this application will not be limited to the embodiments shown in the specification, but should conform to the broadest scope consistent with the principles and novelties disclosed in the specification.

What is claimed is:

1. A sound absorption apparatus comprising:
 a plurality of sound absorption units each including:
  a single connection member including a first flat connection surface and a second flat connection surface arranged opposite to the first flat connection surface, the first flat connection surface and the second flat connection surface being parallel to a flow direction of a cooling air flow, and the cooling air flow being an air flow flowing through the sound absorption unit; and
  a plurality of sound absorption members corresponding to the single connection member, each of the plurality of sound absorption members being permeable and including:
   a third flat connection surface configured to connect to one of the first flat connection surface and the second flat connection surface, the third flat connection surface being a right-angled flat surface; and
   a sound absorption surface surrounding the one of the first flat connection surface and the second flat connection surface.

2. The sound absorption apparatus according to claim 1, wherein:
 the sound absorption unit has a variable cross-section; and
 for each of the plurality of sound absorption members:
  a part of the sound absorption surface facing away from the third flat connection surface has a cross-sectional area gradually changing in a direction along the third flat connection surface; and
  a width ratio of a part of the sound absorption surface facing toward the cooling air flow over a part of the sound absorption surface facing away from the cooling air flow is approximately 2~3:0~1.

3. The sound absorption apparatus according to claim 1, wherein:
 each of the plurality of sound absorption members has a shape of a right-angled polygonal pyramid, a right-angled polygonal prism, a semi-cone, or a semi-circular prism.

4. The sound absorption apparatus according to claim 1, further comprising:
 an enclosure;
 wherein:
  the plurality of sound absorption units is disposed inside the enclosure;
  a cooling passage is formed between adjacent ones of the plurality of sound absorption units for supplying the cooling air flow; and
  a cross-sectional area of the cooling passage gradually increases in the flow direction of the cooling air flow and a cross-sectional area of each of the plurality of sound absorption units gradually decreases in the flow direction of the cooling air flow.

5. The sound absorption apparatus according to claim 4, further comprising:
 a fixation member;
 wherein:

the connection member of each of the plurality of sound absorption units is connected to the enclosure through the fixation member;

the fixation member is disposed between the first flat connection surface and the second flat connection surface of each of the plurality of sound absorption units; and the fixation member is configured to fix the connection member of each of the plurality of sound absorption units inside a sound absorption space, such that the sound absorption surface of each of the plurality of sound absorption members of each of the plurality of sound absorption units is disposed inside the sound absorption space.

6. The sound absorption apparatus according to claim 5, further comprising:

a sound absorption material arranged on a side of the enclosure facing toward the plurality of sound absorption units.

7. A method of manufacturing a sound absorption unit comprising:

obtaining a sound absorption material with a constant cross-sectional area;

determining a cutting line according to the sound absorption material with the constant cross-sectional area, and cutting the sound absorption material according to the cutting line to obtain a first sound absorption member and a second sound absorption member, a surface of each of the first sound absorption member and the second sound absorption member being a cutting surface;

obtaining a connection member including a first flat connection surface and a second flat connection surface arranged opposite to the first flat connection surface;

for each of the first sound absorption member and the second sound absorption member, selecting a flat surface facing away from the cutting surface as a third flat connection surface, the third flat connection surface being a right-angled flat surface; and connecting the third flat connection surface of the first sound absorption member to one of the first flat connection surface and the second flat connection surface of the connection member, and connecting the third surface of the second sound absorption member to another one of the first flat connection surface and the second flat connection surface of the connection member.

8. The method according to claim 7, wherein determining the cutting line according to the sound absorption material with the constant cross-sectional area includes:

determining a tilted cutting line according to the sound absorption material with the constant cross-section area, a length of the tilted cutting line being greater than an edge of the sound absorption material with the constant cross-section area.

9. An electronic device comprising:

a cooling device;

a working device; and a sound absorption apparatus disposed between the cooling device and the working device and including a plurality of sound absorption units;

wherein the plurality of sound absorption units each includes:

a single connection member including a first flat connection surface and a second flat connection surface arranged opposite to the first flat connection surface, the first flat connection surface and the second flat connection surface being parallel to a flow direction of a cooling air flow, and the cooling air flow being an air flow flowing through the sound absorption unit; and a plurality of sound absorption members corresponding to the single connection member, each of the plurality of sound absorption members being permeable and including:

a third flat connection surface configured to connect to one of the first flat connection surface and the second flat connection surface, the third flat connection surface being a right-angled flat surface; and a sound absorption surface surrounding the one of the first flat connection surface and the second flat connection surface.

10. The electronic device according to claim 9, wherein:

the working device includes a plurality of working units;

the plurality of sound absorption units is each located right in between one of the plurality of working units and the cooling device; and a thickness of one of the plurality of sound absorption units is no smaller than a thickness of one of the plurality of working units.

11. The electronic device according to claim 9, wherein:

the sound absorption unit has a variable cross-section; and for each of the plurality of sound absorption members:

a part of the sound absorption surface facing away from the third flat connection surface has a cross-sectional area gradually changing in a direction along the third flat connection surface; and a width ratio of a part of the sound absorption surface facing toward the cooling air flow over a part of the sound absorption surface facing away from the cooling air flow is approximately 2~3:0~1.

12. The electronic device according to claim 9, wherein:

each of the plurality of sound absorption members has a shape of a right-angled polygonal pyramid, a right-angled polygonal prism, a semi-cone, or a semi-circular prism.

13. The electronic device according to claim 9, wherein the sound absorption apparatus further includes:

an enclosure;

wherein:

the plurality of sound absorption units is disposed inside the enclosure;

a cooling passage is formed between adjacent ones of the plurality of sound absorption units for supplying the cooling air flow; and a cross-sectional area of the cooling passage gradually increases in the flow direction of the cooling air flow and a cross-sectional area of each of the plurality of sound absorption units gradually decreases in the flow direction of the cooling air flow.

14. The electronic device according to claim 13, wherein the sound absorption apparatus further includes:

a fixation member;

wherein:

the connection member of each of the plurality of sound absorption units is connected to the enclosure through the fixation member;

the fixation member is disposed between the first flat connection surface and the second flat connection surface of each of the plurality of sound absorption units; and the fixation member is configured to fix the connection member of each of the plurality of sound absorption units inside a sound absorption space, such that the sound absorption surface of each of the plurality of sound absorption members of each of the plurality of sound absorption units is disposed inside the sound absorption space.

15. The electronic device according to claim 14, wherein the sound absorption apparatus further includes:
a sound absorption material arranged on a side of the enclosure facing toward the plurality of sound absorption units.

* * * * *